Sept. 12, 1950  J. K. SMITH  2,522,406
COMBINATION VALVE
Filed June 10, 1946
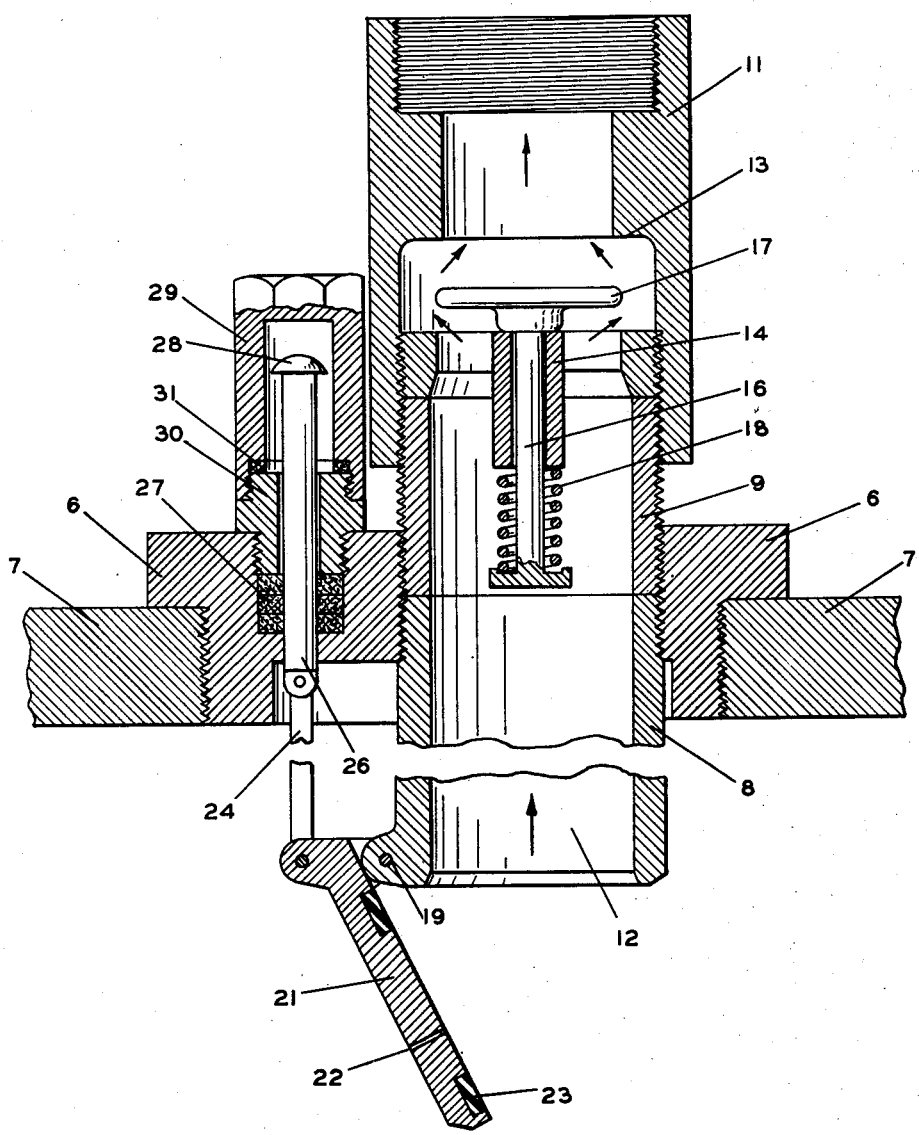
INVENTOR.
J. K. SMITH
BY
Hudson and Young
ATTORNEYS Patented Sept. 12, 1950

2,522,406

UNITED STATES PATENT OFFICE 2,522,406

COMBINATION VALVE

John Knox Smith, Bartlesville, Okla., assignor to Phillips Petroleum Company, a corporation of Delaware Application June 10, 1946, Serial No. 675,730

4 Claims. (Cl. 137—21)

This invention relates to valves. In one particular aspect it relates to excess flow valve mechanisms having manually operable means for closing a fluid conduit when desired without regard to rate of flow therethrough. In another specific aspect it relates to a fitting containing a combination of valves and other elements useful on outlet lines of liquid petroleum gas storage tanks.

Although my invention is operative and applicable to any pipe line used for removing such commodities as gas, gasoline, oil or other liquids from containers, it is particularly useful when applied to outlet pipe lines of liquid petroleum gas storage tanks, or other closed vessels containing highly volatile liquids.

The use of excess flow valves of conventional design on outlet lines of liquid petroleum gas storage tanks has the great disadvantage of permitting small leaks in an outlet line between the excess flow valve, which is customarily installed adjacent to the junction of the storage tank and outlet line, and the terminal hand valve with which such lines are ordinarily closed. A leak or partial breakage of the line in such location may not cause sufficient flow to close an excess flow valve but may result in loss of much valuable material and create serious fire and explosion hazard. An excess flow valve mechanism for liquid petroleum gas storage tanks which may be manually closed when desired is a needed improvement in the equipment of the industry.

One object of this invention is to provide externally operable means for closing a line leading from a tank inside said tank.

Another object, when a tank is provided with an excess flow valve secured thereto, is to provide means for closing the passage between the tank and excess flow valve so that the excess flow valve may be removed for repair, replacement or other reasons while fluid is still in the tank.

Another object is to provide an excess flow valve mechanism which is simple, rugged, foolproof and cheap in construction and which has the particular advantageous arrangement and combination of parts shown.

Other objects and advantages will become apparent to those skilled in the art as this disclosure proceeds.

Drawing

The accompanying drawing illustrates diagrammatically a vertical section of one preferred embodiment of my invention. Referring thereto a plug 6 having two openings of unequal size therethrough is shown inserted into the top 7 of a liquid petroleum gas storage tank. A three-part valve body comprising sections 8, 9 and 11 having a fluid conduit 12 therethrough extends through the larger of said openings in gas tight relation with plug 6.

An annular valve seat 13 is disposed in said fluid conduit in body section 11 and is preferably made integral with said body section. Body section 11 is suitably threaded to be joined to body section 9 and to an outlet pipe (not shown) leading to any desired point for delivery of fluid and there conventionally closed by a hand valve.

Body section 9 is suitably threaded for connection with plug 6 and section 11. A supporting member 14 having any desired plan which does not unduly restrict the flow of fluid through conduit 12 is disposed in that portion of conduit 12 encircled by body member 9. A moveable valve stem 16 is adapted to be slidably supported by said supporting member and is disposed in said conduit. A moveable valve head 17 is attached to said valve stem in said conduit and is adapted to be moved by flow of fluid in excess of a predetermined rate to seat on valve seat 13 and thereby substantially close said conduit. A compressible resilient member shown as a coil spring 18 is disposed to encircle said valve stem and rest upon said supporting member and is adapted to resist movement of said valve head to seat on said valve seat.

Body section 8 is externally threaded for connection to plug 6 and is made of sufficient length to extend to the lowest level from which withdrawal of liquid is desired. Body section 8 has its lower extremity adapted to serve as a valve seat and is provided with an attachment 19 for a hinge adjacent to its lower extremity. A hinged valve closure member 21 having a bleed hole 22 therein is attached thereto and is adapted to be swung to seat on the last-mentioned valve seat and thereby substantially close said conduit. Member 21 carries an annular sealing member 23 adapted to be forced into sealing relation with the lower extremity of body member 8.

Link member 24 connects member 21 with a manually operable push rod 26 which extends through the lesser of said openings in plug 6. This opening is composed of an inner, smaller portion adapted to receive push rod 26 slidably and an outer, larger portion adapted to receive push rod 26 and packing material 27 surrounding said push rod. This upper portion of said opening is suitably threaded to receive threaded packing gland 30, adapted to compress packing material 27 and force the same into sealing relation with plug 6 and push rod 26. Push rod 26 carries a head 28 adapted to receive manual pressure to move the push rod. Head 26 and that portion of push rod 26 extending beyond gland 30 are enclosed in a housing 29. This housing is suitably threaded to be attached to the upper portion of gland 30. An annular sealing member 31 is disposed in the lower portion of housing 29 and is adapted to be forced into sealing relation with housing 29 and gland 30 when said housing is screwed into place and thereby to effectually prevent leakage of confined liquid petroleum gas between push rod 26 and packing 27.

*Operation*

Starting with the valve installed as shown and described in a storage tank containing liquid petroleum gas and connected to an outlet pipe (not shown) closed conventionally by a terminal hand valve (not shown) and with valve head 17 and closure member 21 in positions as shown there is no flow of fluid through conduit 12 so long as said outlet pipe is closed. When the terminal hand valve of said outlet pipe is opened, liquid flows through conduit 12 in the direction shown by the arrows. When the rate of flow becomes sufficient to exert a force upon valve head 17 great enough to overcome the resistance of coil spring 18, said valve head is moved to seat on valve seat 13 and flow is substantially shut off. Such excess flow may be caused by breakage of the outflow pipe, too great opening of the terminal valve closing the same or by various other causes. Since both valve head 17 and seat 13 are shown of ordinary metal construction, there will be some leakage around the valve head, but such leakage is insignificant so far as waste is concerned.

When the outlet pipe is again closed, pressure gradually builds up therein as a result of such leakage around said valve head. When pressure in the outlet pipe becomes sufficiently high the spring 18 pushes valve stem 16 down, carrying valve head 17 to its open position.

When a small leak or partial breakage occurs in the outlet pipe which is not sufficient to cause valve head 17 to close, conduit 12 can be closed manually from outside the tank by removing housing 29 and pushing down on the head of push rod 26. This pressure is transmitted via link 24 to closure member 21 which is swung into position to bring the sealing member 23 into contact with the valve seat-shaped lower extremity of body member 8, thus closing the conduit 12 except for insignificant leakage through the bleed hole 22.

Pressure from within the storage tank holds member 21 in place until a closed outlet pipe is again obtained. Then leakage through bleed hole 22 causes pressure to again build up in the outlet pipe and when this pressure becomes approximately equal to the pressure within the storage tank, member 21 drops open because of its own weight.

The construction shown permits any part of the valve or outlet lines external to the tank to be removed or repaired at any time without the necessity of emptying the storage tank. Fire and explosion hazard is greatly reduced because the outlet may be quickly and positively closed at any time a small leak is discovered. Convenience in operation is secured since the operator may merely close the outlet by means of member 21 and await repairs at any convenient time.

Many obvious changes in construction may be made in this valve. For instance body section 11 might be externally threaded to engage internal threads in body member 9, or these two body members may be made in one piece. The modification shown is preferred, however, because of easy accessibility of the parts thereof for adjustment or repair and ease of securing proper relationship between the diameters of the various parts of conduit 12.

The valve may be modified for use in a horizontal position by constructing the inner extremity of member 8 to lie in a plane inclined to the longitudinal axis of said member at an angle substantially less than 90°, thus permitting member 21 to open of its own weight when pressure is substantially equal on both sides thereof.

The valve may also be used in an inverted position inserted into the bottom of a tank or similar vessel provided that head 28 or push rod 26 be made sufficiently heavy to move member 21 to open conduit 12.

It is to be understood that the form of this invention, herewith shown and described, is to be taken as a preferred example of the same and that various changes in shape, size and arrangement of parts may be made without departing from the spirit of the invention which is defined and solely limited by the scope of the subjoined claims.

Having described my invention and explained its operation, I claim:

1. An excess flow valve mechanism comprising in combination: a valve body having a fluid conduit therethrough; a valve seat disposed in said conduit; a moveable valve head disposed in said conduit adapted to be moved by flow of fluid in excess of a predetermined rate to seat on said valve seat and thereby substantially close said conduit; a hinged closure member, having a bleed hole therein, attached to said body adapted to be swung on a hinge to substantially close said conduit; means for swinging said closure member to substantially close said conduit comprising in combination a link hingedly attached to said closure member and a moveable, manually operable push rod hingedly attached to said link, and means for confining movement of said push rod to a substantially rectilinear path; said closure member being adapted to be opened by gravity.

2. An excess flow valve mechanism comprising in combination: a valve body comprising a plurality of separable sections having a fluid conduit therethrough, one of said sections terminally disposed having an extremity adapted to serve as a valve seat; a valve seat disposed in said conduit; a moveable valve head disposed in said conduit adapted to be moved by flow of fluid in excess of a predetermined rate to seat on said valve seat and thereby substantially close said conduit; a hinged closure member, having a bleed hole therein, attached to said terminal body member adapted to be swung on a hinge to seat on said extremity thereof and thereby to substantially close said conduit; means for swinging said closure member to substantially close said conduit comprising in combination a link hingedly attached to said closure member and a moveable, manually operable push rod hingedly attached to said link, and means for confining movement of said push rod to a substantially rectilinear path; said closure member being adapted to be opened by gravity.

3. An excess flow valve mechanism comprising in combination: a plug adapted to be inserted through a wall of a containing vessel and having two openings therethrough, namely, a larger threaded opening and a smaller opening having a smaller portion in the inner part of said plug and a larger portion in the outer part thereof; a valve body, having a fluid conduit therethrough, comprising three detachable sections, namely, a threaded inner section screwed into the inner part of said larger threaded opening in said plug, a middle section screwed into the outer part of said opening and held in juxtaposition with said inner section by said plug, and an outer section; a valve seat disposed in said conduit in said outer section; a moveable valve head disposed in said conduit adapted to be moved by flow of fluid in excess of a predetermined rate to seat on said valve seat and thereby substantially close said conduit; a hinged closure member having a bleed hole therein attached to said inner body section adjacent to the inner extremity of the same adapted to be swung on a hinge to rest upon said inner extremity of said body section and thereby to substantially close said conduit; means for swinging said closure member to substantially close said conduit comprising in combination a link hingedly attached to said closure, a moveable manually operable push rod hingedly attached to said link extending through the smaller of said openings in said plug in gas tight sealing relation therewith; means for maintaining such gas tight sealing relation; and a removable housing enclosing that portion of said push rod extending beyond the outer surface of said plug.

4. A liquid petroleum gas storage system comprising in combination: a tank; a plug having two openings therethrough inserted through a wall of said tank; a valve body, comprising a plurality of separable sections and having a fluid conduit therethrough, inserted through one of said openings in gas tight sealing relation with said plug; a valve seat disposed in said conduit; a moveable valve head disposed in said conduit adapted to be moved by flow of fluid in excess of a predetermined rate to seat on said valve seat and thereby substantially close said conduit; a hinged closure member, having a bleed hole therein, attached to said body adapted to be swung on a hinge to substantially close said conduit; and means for swinging said closure member to substantially close said conduit comprising in combination a link hingedly attached to said closure member and a moveable, manually operable push rod hingedly attached to said link, extending through the other of said openings in said plug in gas tight sealing relation therewith.

JOHN KNOX SMITH.

REFERENCES CITED

The following references are of record in the file of this patent:

UNITED STATES PATENTS

| Number | Name | Date |
|---|---|---|
| 407,981 | Williams | July 30, 1889 |
| 465,605 | Walters | Dec. 22, 1891 |
| 564,095 | Mather | July 14, 1896 |
| 838,055 | Pitts | Dec. 11, 1906 |
| 1,246,752 | Kelley | Nov. 13, 1917 |
| 1,699,095 | Clark | Jan. 15, 1929 |
| 1,782,238 | Kirchhan | Nov. 18, 1930 |